(12) United States Patent
Hock (10) Patent No.: US 6,931,028 B1
(45) Date of Patent: Aug. 16, 2005

(54) SCALEABLE RSVP SIGNALING BETWEEN VOIP DIAL-PEERS FOR TANDEM VOICE SOLUTIONS

(75) Inventor: Thomas Hock, Capel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 818 days.

(21) Appl. No.: 09/751,523

(22) Filed: Dec. 28, 2000

(51) Int. Cl.⁷ .................. H04L 12/56; H04L 12/66; H04J 3/16
(52) U.S. Cl. .............. 370/477; 370/229; 370/356; 370/365; 379/900
(58) Field of Search .................. 370/229–232, 370/235, 236, 252, 254, 352, 356, 389, 401, 412, 465, 477; 379/900

(56) References Cited

U.S. PATENT DOCUMENTS

| | | | |
|---|---|---|---|
| 6,226,686 B1 * | 5/2001 | Rothschild et al. ......... | 709/245 |
| 6,286,052 B1 * | 9/2001 | McCloghrie et al. ....... | 709/238 |
| 6,477,164 B1 * | 11/2002 | Vargo et al. ................. | 370/356 |
| 6,515,966 B1 * | 2/2003 | Bardalai et al. ............. | 370/236 |
| 6,519,254 B1 * | 2/2003 | Chuah et al. ................ | 370/389 |
| 6,538,416 B1 * | 3/2003 | Hahne et al. ................ | 370/431 |
| 6,594,268 B1 * | 7/2003 | Aukia et al. ................. | 370/400 |
| 6,721,272 B1 * | 4/2004 | Parnafes et al. ............. | 370/235 |
| 2002/0041590 A1 * | 4/2002 | Donovan ..................... | 370/352 |
| 2002/0054405 A1 * | 5/2002 | Guo et al. .................... | 359/118 |
| 2004/0022191 A1 * | 2/2004 | Bernet et al. ................ | 370/230 |

OTHER PUBLICATIONS

Neogi et al, Performance Analysis of an RSPV–Capable Router, Sep./Oct. 1999 IEEE Network, pp. 56–63.*
Pan et al, YESSIR: A Simple Reservation Mechanism for the Internet, ACM SIGCOMM Computer Communication Review, vol. 29, Issue 2, Apr. 1999, pp. 89–101.*
R. Braden, Ed., ISI; L. Zhang, UCLA; S. Berson, ISI; S. Herzog, IBM Research; S. Jamin, Univ. of Michigan; Sep. 1997, Resource ReSerVation Protocol (RVSP), Network Working Group, 112 pgs.

* cited by examiner

*Primary Examiner*—John Pezzlo
*Assistant Examiner*—Ahmed Elallam (57) ABSTRACT

A method for high quality voice communication over an IP network. The method is implemented using an IP network device. Voice communication quality of service is initiated through the transmission of a path message for the voice communication. The path message is configured for establishing a communications path through the nodes of the IP network. A reservation message is received in response to the path message. The reservation message is configured for specifying a range of voice streams for a bandwidth reservation, allowing a single reservation message to specify bandwidth for quality of service for multiple voice calls. The bandwidth reservation for the range of voice streams is implemented in accordance with the reservation message. The path message can be transmitted from an originating IP network device, such as an originating VoIP gateway, and can be generated by a first voice application executing thereon. The reservation message can be received from a terminating IP network device, such as a terminating VoIP gateway, and can be generated by a second voice application executing thereon. The reservation message includes a source port range specifying the range of voice streams for transmission. A bandwidth reservation table within the IP network device is updated in accordance with the reservation message, and bandwidth for transmission of the range of voice streams is reserved using the reservation table.

32 Claims, 5 Drawing Sheets

401 — Transmit a path message to initiate voice communication between VoIP peers 402 — Receive a reservation message in response to the path message specifying a range of voice streams 403 — Update bandwidth reservation tables along the communications path in accordance with the reservation message 404 — Reserve bandwidth for the transmission of the range of voice streams using the updated reservation tables 405 — Implement the multiple voice streams between the VoIP peers

SCALEABLE RSVP SIGNALING BETWEEN VOIP DIAL-PEERS FOR TANDEM VOICE SOLUTIONS

TECHNICAL FIELD

The present invention relates generally to methods and systems implementing voice communication over packet switched digital networks. More specifically, the present invention pertains to a method and system for implementing scaleable RSVP signaling between VoIP dial-peers.

BACKGROUND ART

There presently exists a significant amount of interest in the adaptation of packet switched network technologies, such as, for example, Frame Relay, IP and ATM, to carrying voice communication (e.g., telephone calls). Of the different packet switched network technologies, hereafter simply referred to as data network technologies, IP (Internet Protocol) is becoming increasingly wide spread and widely supported, mainly due to the growth of the Internet. Accordingly, the data networks which underlie the IP structure of the Internet have been growing at a much faster rate than the dedicated voice networks of the telephone companies. Soon the amount of data traffic will exceed that of voice traffic. As a result of this trend, more and more voice is being sent over data networks (e.g., Voice over IP) than data is being sent over voice networks (via V.34 and V.90 modems).

As use of the public Internet exploded in the mid-1990s, many users began implementing IP-based networks specifically adapted for voice over IP (VoIP) applications. To support such users, equipment manufacturers are developing products to enable inexpensive, universal voice over data networks.

Although significant progress has been made in the ad hoc engineering of data networks to carry voice as well as data, market requirements soon demanded a true convergence of these technologies into a single and ubiquitous communications service without being limited by the underlying technology. The widespread adoption of VoIP applications is dependent upon development of interconnection and interworking standards in order to deliver voice services ubiquitously over IP.

IP is based upon packet or cell switching technologies. This is in contrast to the public telephone network, which is a circuit switching technology, designed to carry voice transmissions. The packet switching and cell switching networks perform statistical multiplexing, wherein they dynamically allocate bandwidth to various links based on their transmission activity. Since bandwidth is not reserved for any specific path, the available bandwidth is allotted according to network needs at any particular time.

The traditional voice (or circuit switching) network uses a path dedicated to the transmission for the duration of the call, which is sent in a continuous bit stream. The line is monopolized by a call until it is terminated, even when the caller is put on hold and during periods of silence. Although this guarantees reliable and immediate transmission of voice, it results in very inefficient use of bandwidth. A line that is dedicated to the telephone cannot be utilized by other data even when there are no voice transmissions.

In contrast, data networks were originally designed to handle bursty data traffic, and as such, packet switching networks are inherently less efficient than the circuit switching network in dealing with voice. To achieve good voice quality, the delay of voice packets across the network must be minimal. Due to the shared nature of the packet/cell switching network, it might take time for transmissions to travel across the network. A transmission can be delayed because of network congestion. For example, it might "get stuck" behind a long data transmission that delays other packets. Network congestion can also result in dropped packets, which also detrimentally affects the integrity of voice transmissions.

Unfortunately, unlike most data applications, voice is very sensitive to delay. Good voice quality provides a faithful recreation of the conversation, with the same tone, inflection, pauses and intonation used by the speakers. Long and variable delays between packets result in unnatural speech and interfere with the conversation. Dropped packets result in clipped speech and poor voice quality. Fax transmissions are even more sensitive to the quality of the transmission and are less tolerant of dropped packets than voice. To improve the quality of voice transmission over data networks, quality of service standards are being developed.

Quality of service, or QoS, generally refers to the ability to define a level of performance in a data network. For example, some types of data networks specify modes of service that ensure optimum performance for latency sensitive traffic such as real-time voice and video. QoS has become a major issue on the Internet as well as in enterprise networks, because voice and video are increasingly traveling over IP-based data networks that were not designed for continuous speech or viewing.

RSVP (Reservation Protocol) is a well known IETF (Internet Engineering Task Force) communications protocol for implementing QoS between nodes within IP networks. RSVP primarily functions by signaling a router to reserve bandwidth for real-time transmission. RSVP is designed to clear a path for audio and video traffic eliminating annoying skips and hesitations. It has been sanctioned by the IETF, due to the fact that voice traffic is expected to increase dramatically on the Internet.

However, RSVP as currently defined imposes a significant penalty with regard to data network traffic overhead. A significant amount of data overhead is required for managing RSVP compliant QoS voice streams. For example, one prior art RSVP implementation uses a scheme where a unique RSVP session is created with an individual reservation for each voice stream. This is inefficient for bandwidth utilization because it generates separate "Path" and "RESV" packet streams (including periodic updates) for each voice stream. For example, as currently implemented, the "PSB" and "RSB" databases on each router along a voice stream path must store a unique record for each Path and Reservation respectively, and each Reservation produces a unique flow descriptor which adds to resource utilization. In a large network, this scheme leads to unmanageable overhead and resource utilization.

Thus, what is required is a method and system for efficiently implementing QoS for multiple voice streams over IP networks. What is required is a solution that reduces the amount of overhead traffic and resource utilization involved in implementing multiple voice streams over IP networks. Additionally, the required solution should significantly reduce RSVP signaling overhead for VoIP calls between VoIP dial-peers on IP network platforms. The present invention provides a novel solution to the above requirements.

DISCLOSURE OF THE INVENTION

The present invention is a method and system for efficiently implementing QoS for multiple voice streams over IP networks. The present invention provides a solution that reduces the amount of overhead traffic and resource utilization involved in implementing multiple voice streams over IP networks. Additionally, present invention significantly reduces RSVP signaling overhead for VoIP calls between VoIP dial-peers on IP network platforms.

In one embodiment, the present invention is implemented as a multiple voice stream bandwidth reservation process over an IP network that extends the functionality of the RSVP (Resource Reservation Protocol) specification with respect to the hand shaking involved in implementing multiple VoIP voice streams. The method is implemented using compliant IP network devices at nodes along a communication path through the IP network.

Voice communication QoS (quality of service) is initiated through the transmission of a path message for the voice communication. The path message is configured for establishing a communications path through the nodes of the IP network. A reservation message is received in response to the path message. The reservation message is configured for specifying a range of voice streams for a bandwidth reservation, allowing a single reservation message to specify bandwidth for quality of service for multiple voice calls. The bandwidth reservation for the range of voice streams is implemented in accordance with the reservation message. The path message can be transmitted from an originating IP network device, such as an originating VoIP gateway, and can be generated by a first voice application executing thereon. Similarly, the reservation message can be received from a terminating IP network device, such as a terminating VoIP gateway, and can be generated by a second voice application executing thereon.

Bandwidth reservation tables within the compliant IP network devices along the communications path are updated in accordance with the reservation message, and bandwidth for transmission of the range of voice streams is reserved using the reservation table. The reservation table is a filter specification table, FILTER_SPEC, in accordance with a version of the RSVP (Resource Reservation Protocol) specification. The reservation message can be a filter specification object, FILTER_SPEC object, in accordance with a version of the RSVP specification. Additionally, the reservation message includes a source address, an initial source port, and a source port range specifying the range of voice streams for transmission (e.g., SrcAddress, InitSrcPort, SrcPortRng).

In so doing, by specifying a range of voice streams with the path message and reservation message, the multiple voice stream bandwidth reservation process reduces the amount of overhead traffic and resource utilization involved in implementing multiple voice streams over IP networks. This significantly reduces RSVP signaling overhead for VoIP calls between, for example, VoIP dial-peers on IP network platforms, thereby improving scalability. The efficiency gains are even greater when the VoIP voice traffic traverses many IP network nodes, as in a case where long distance VoIP calls are implemented.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the embodiments of the invention, a method and system for scaleable signaling between voice over IP dial peers for tandem voice solutions, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention is a method and system for efficiently implementing QoS for multiple voice streams over IP networks. The present invention provides a solution that reduces the amount of overhead traffic and resource utilization involved in implementing multiple voice streams over IP networks. Additionally, present invention significantly reduces RSVP signaling overhead for VoIP calls between VoIP dial-peers on IP network platforms. The present invention and its benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "examining," "accessing," "routing," "determining," "transmitting," "storing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices (e.g., computer system 512 of FIG. 5).

VoIP Method and System of the Invention

Figure 1:
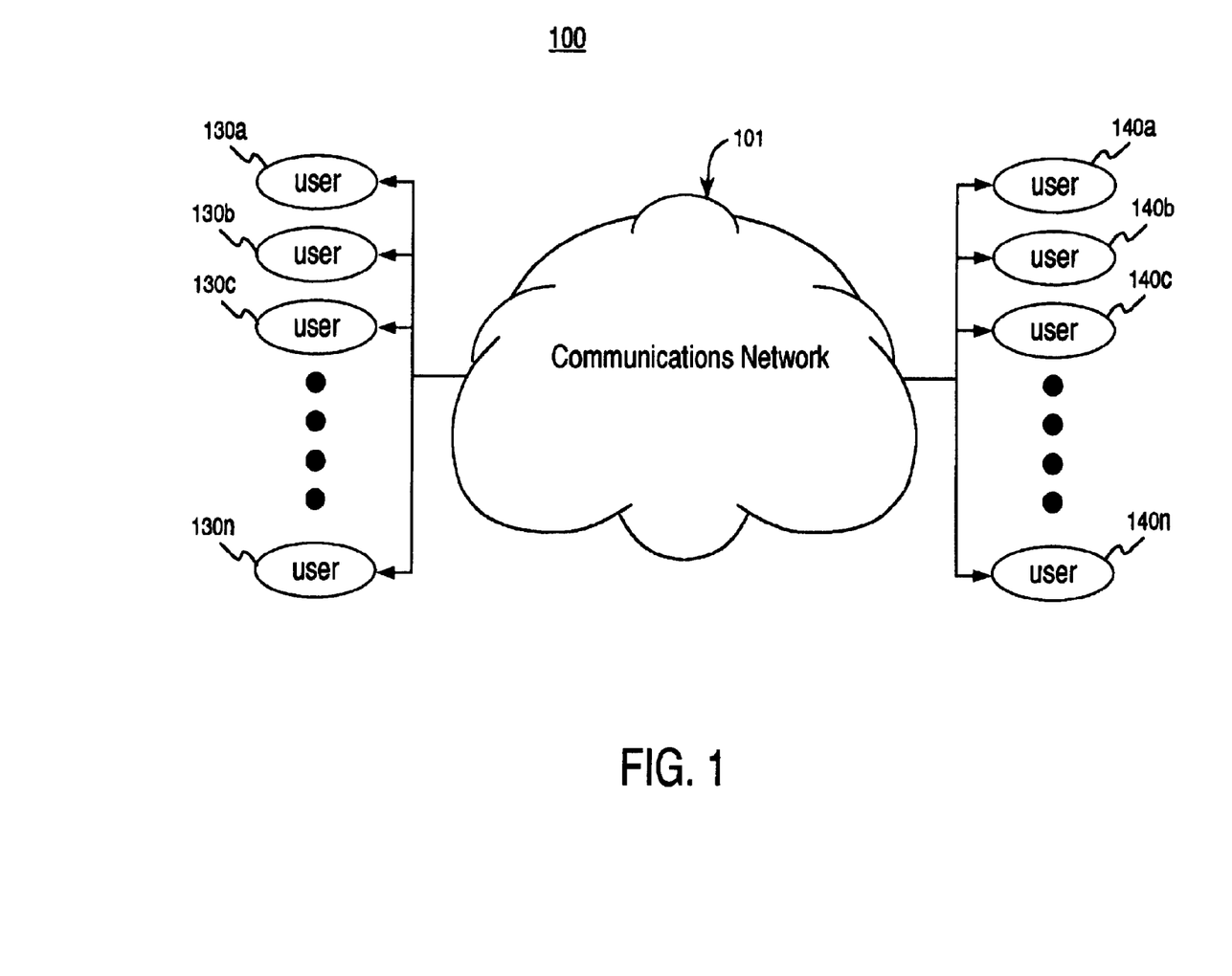
FIG. 1 shows a distributed computer network system operable for implementing digital voice communications between a widely dispersed network of connected users in accordance with one embodiment of the present invention.

Referring now to FIG. 1, a system 100 accordance with one embodiment of the present invention is shown. As depicted in FIG. 1, system 100 shows a distributed computer network 101 operable for implementing digital communications between a widely dispersed network of connected users. A first set of users 130a–n and a second set of users 140a–n are coupled to communications network 101.

Embodiments of the present invention are described in the context of voice communications implemented between clients 130a–n and clients 140a–n. Communications network 101 provides the digital communications connectivity between the clients. In this embodiment, communications network 101 is implemented as an IP based data network. Embodiments of the present invention are directed at providing high QoS (quality of service) voice communication in a manner that efficiently scales to large numbers of connected users.

Unlike most data applications, voice is very sensitive to delay, due to the fact that perceptible voice quality is dependent upon latency and variable delays between packets as they are transmitted through communications network 101. Significant latency result in unnatural speech and interference with conveyed conversations. Dropped packets result in clipped speech and poor voice quality. Fax transmissions are even more sensitive to the quality of the transmission and are less tolerant of dropped packets than voice.

Embodiments of the present invention define extensions to RSVP (Reservation Protocol) to implement VoIP efficiently. RSVP is a well known IETF (Internet Engineering Task Force) communications protocol for implementing QoS between nodes within IP networks. The basic function of RSVP is to provide a framework allowing the nodes comprising communications network 101 to signal one another (e.g., an IP gateway signaling a router within the core of communications network 101) to reserve bandwidth for real-time transmission.

The extensions to RSVP as employed by embodiments of the present invention allow the aggregation of the bandwidth requirements for multiple voice streams, and the aggregate management of communications pathways within communications network 101 to maintain low latency. The aggregation of the bandwidth requirements and the aggregation of the management of the multiple voice streams greatly reduces data network traffic overhead. For example, due to the fact that a significant amount of data overhead is required for managing RSVP compliant QoS voice streams, the use of unique RSVP session handshakes (e.g., for each individual voice stream) is avoided as much as possible. The bandwidth aggregation aspect of the present invention eliminates the generation of separate "Path" and "RESV" packet streams for each of multiple voice streams.

Thus, for example, the QoS bandwidth requirements for voice communication (e.g., voice streams) between users 130a–n and users 140a–n can be managed as a single reservation, wherein the PSB and RSB databases on each router along a voice stream path within communications network 101 can store a single unique record for the Path and Reservation respectively, and each Reservation provides a flow descriptor describing the aggregate bandwidth requirements of the voice streams for users 130a–n and users 140a–n. In a large network, as in a case where communications network 101 spans the Internet and users 130–140 include many hundreds of simultaneous voice calls, the method of the present invention to provides for efficiently scaleable overhead and resource utilization requirements.

Figure 2:
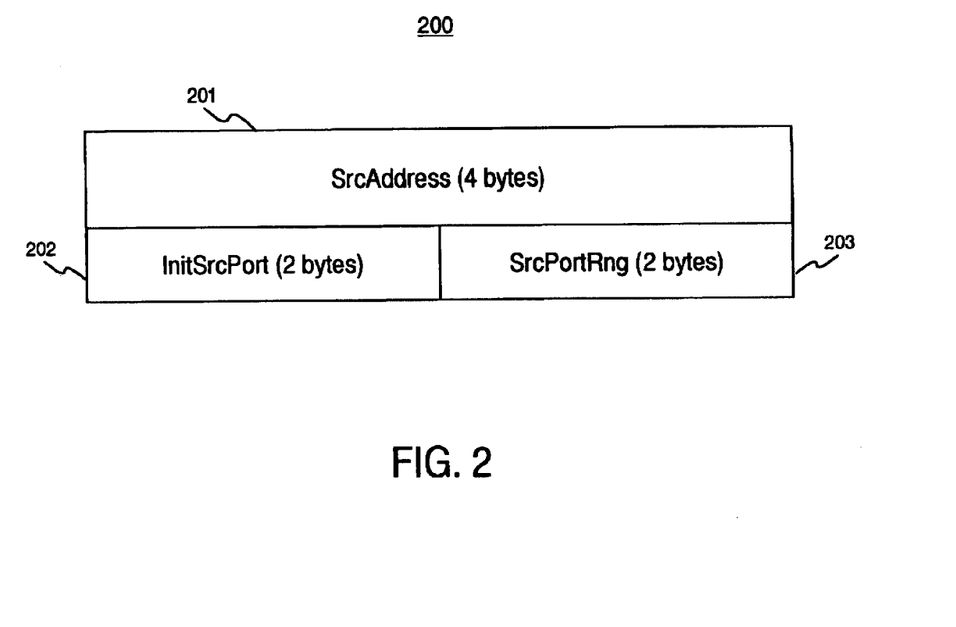
FIG. 2 shows a diagram of the format of a reservation message in accordance with one embodiment of the present invention.

Referring now to FIG. 2, a diagram showing the format of a reservation message 200 in accordance with one embodiment of the present invention is shown. As depicted in FIG. 2, reservation message 200 includes three portions, a source address 201, an initial source port 202, and a source port range 203.

In accordance with RSVP standards, reservation message 200 is comprised of a filter specification object (FILTER_SPEC object) depicted in FIG. 2. It should be noted that other objects are also included in reservation message 200, in addition to the filter specification object. As such, the source address 201 comprises four bytes of address information. However, wherein the standard RSVP filter specification object would include only a two byte source port, reservation message 200 of the present embodiment includes a two byte initial source port 202 and a two byte source port range 203. Thus, reservation message 200 constitutes an extension to conventional RSVP filter specification object classes, wherein the enumeration of an initial source port 202 and a source port range 203 allows the aggregate bandwidth allocation to ensure QoS for the range of voice streams specified.

Figure 3:
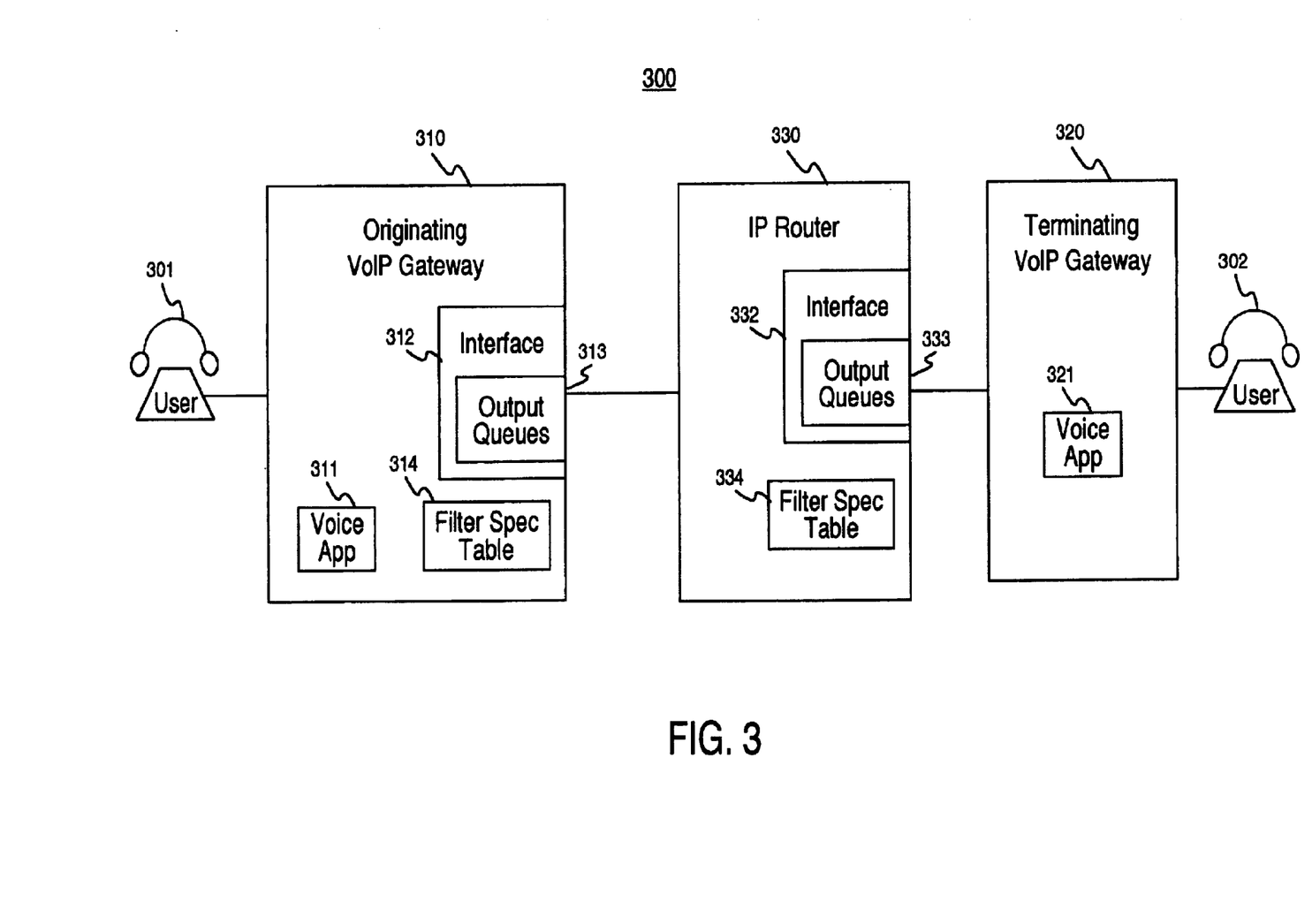
FIG. 3 shows a diagram of a VoIP dial-peer system in accordance with one embodiment of the present invention.

FIG. 3 shows a diagram of a VoIP dial-peer system in accordance with one embodiment of the present invention. As depicted in FIG. 3, system 300 includes an originating user 301 and a terminating user 302. User 301 is coupled to an originating gateway 310. Gateway 310 functions as a computer system platform for executing a voice application 311 (e.g., a software program specifically configured to implement VoIP). Gateway 310 also includes an interface 312 for coupling to other components comprising the IP network, depicted in FIG. 3 as IP router 330. The IP router 330 includes an interface 332 for coupling to terminating gateway 320. Gateway 320, as with the originating gateway 310, executes a voice application 321 for providing voice communication to a coupled user 302. The interfaces 312 and 332 include respective output queues 313 and 333, and also include respective filter specification tables 314 and 334.

Referring still to FIG. 3, as is well known, RSVP compliant VoIP voice streams are typically categorized by packets that fall into UDP port range 16384–32767 and/or have precedence 5 in the IP header. Thus, it is beneficial to have a single RSVP session between VoIP dial-peers that specifies a single flow descriptor with these parameters. Aggregating the bandwidth requirements with a single flow descriptor greatly reduce the overhead and resource utilization issues for a tandem voice solution that is handling a large number of voice streams between VoIP dial-peers, as a case where users 301–302 comprises many hundreds of coupled users.

As depicted in FIG. 3, the originating gateway 310 and the terminating gateway 320 comprises dial peers. The first step of the process involves the dial-peers, gateways 310 and 320, managing a single session with a unique DestAddress, ProtocolID DestPort triple for the dial-peer for themselves.

Additionally, the C-Type reservation message 200 (shown in FIG. 2) specifies a SrcAddress 201, InitialSrcPort 202, and SrcPortRange 203 (and possibly a Precedence field). As described above, this has effect of extending the standard RSVP C-type reservation, wherein the Path SENDER_TEMPLATE and RESV FILTER_SPEC objects only have a C-Type=1 defined for IPv4 which includes an Ipv4 SrcAddress and SrcPort. With this enhancement, a single Path (e.g., path message) and RESV (e.g., reservation message) can be specified for the range of voice streams between VoIP dial-peers 301–302, thus significantly reducing network traffic. Additionally, the PSB and RSB databases would only have a single record for each dial-peer pair, and only a single flow descriptor needs to be processed. This will mean lower resource utilization on the intermediary routers, such as IP router 330. As calls are placed and torn down, the bandwidth requirements can be changed since the RSVP specification already allows for dynamic changes for the Path SENDER_TSPEC and RESV FLOWSPEC.

An additional benefit of this mechanism is that dial-peers, such as gateways 310 and 320, would have some state information about the far-end peer. It could determine that it has a path to the far end peer and request the bandwidth before it even tries to set up the call.

Referring still to FIG. 3, in normal operation, the originating voice application 311 sends a path message (RSVP_PATH) to the terminating voice application 321 to establish a path through the IP network. The terminating voice application 321 responds with a reservation message (RSVP_RESV) back to the originating voice application 311 to establish bandwidth reservations for the voice streams. When routers along the path (e.g., IP router 330) receive the reservation message, they use the filter specification (Filter_Spec) information from the message to fill in the filter specification table (e.g., filter specification table 334) and then pass the reservation message on. When the originating gateway 310 receives the reservation message, it also uses the information to fill in its respective filter specification table 314. The filter specification tables 314 and 334 are used to control the prioritization of output queues 313 and 333 respectively, thereby allocating bandwidth in accordance with the relative priority of the output queues.

It should be noted that in a case of operation with a IP network node (e.g., router, etc.) that does not support the RSVP extension scheme of the present invention, when a VoIP dial-peer sends a Path/RESV message with a SENDER-TEMPLATE/FILTER_SPEC with the new C-Type, it may receive an error message back with Error Code=14, Unknown Object C-Type. In such occurrence, VoIP dial-up peers in accordance with the present invention will have to revert back to the conventional RSVP scheme.

Figure 4:
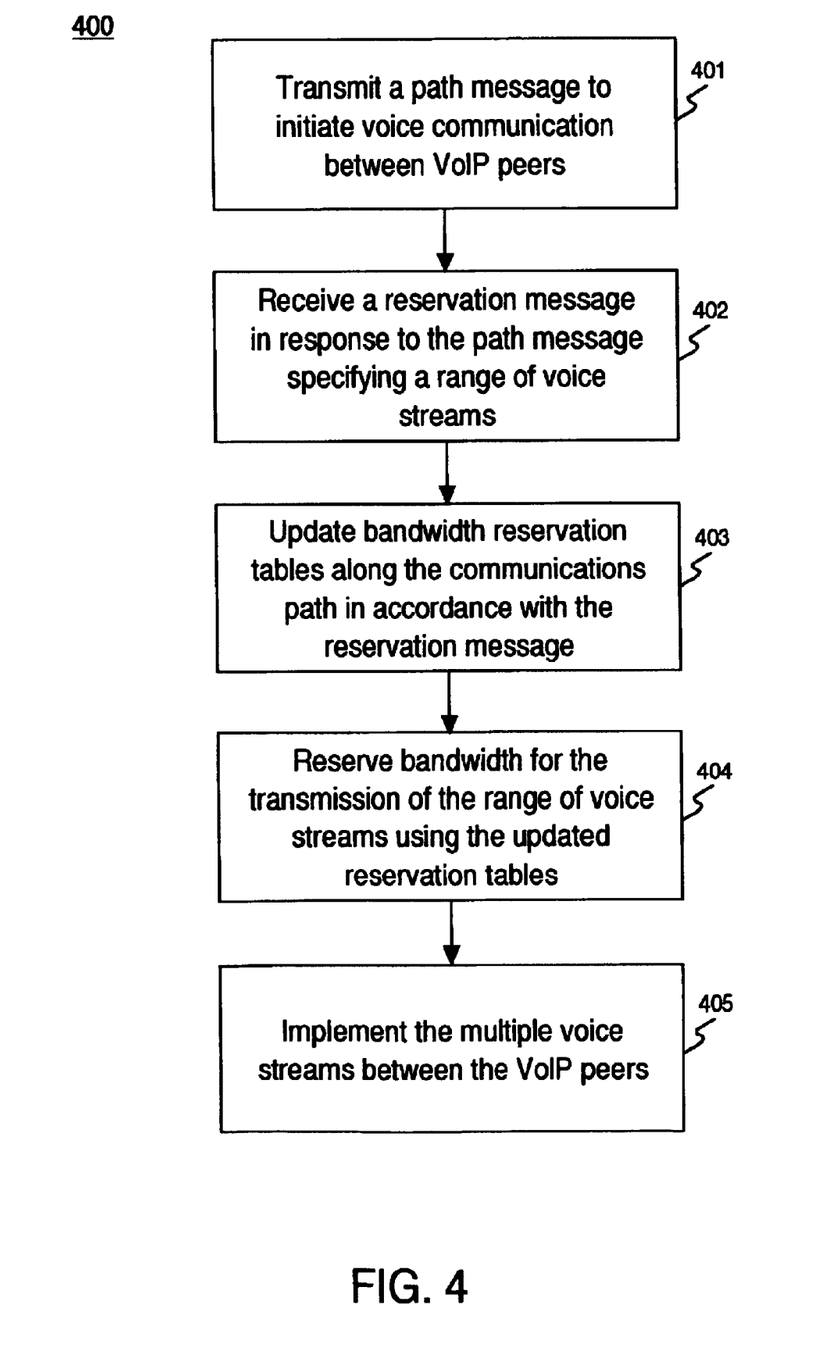
FIG. 4 shows a flow chart of the operating steps of a VoIP dial peer process in accordance with one embodiment of the present invention.

Referring now to FIG. 4, a flow chart of the steps of a process 400 in accordance with one embodiment of the present invention is shown. Process 400 depicts the operating steps of implementing a multiple voice stream bandwidth reservation process over an IP network, specifically, with respect to the hand shaking involved in implementing multiple VoIP voice streams. The method is implemented using compliant IP network devices at nodes along a communication path through the IP network, such as, for example system 300 of FIG. 3.

Process 400 begins in step 401, where voice communication QoS (quality of service) is initiated through the transmission of a path message for the voice communication from an originating IP network device. The path message is configured for establishing a communications path through the nodes of the IP network. The originating IP network device is typically a VoIP gateway (e.g., VoIP gateway 310 of FIG. 3), and the path message is generated by a first voice application executing thereon.

In step 402, a reservation message is received by the originating IP network device in response to the path message. The reservation message is configured for specifying a range of voice streams for a bandwidth reservation (e.g., reservation message 200 of FIG. 2), allowing a single reservation message to specify bandwidth for quality of service for multiple voice calls. Similarly, the reservation message can be received from a terminating IP network device, such as a terminating VoIP gateway (e.g., VoIP gateway 320), and can be generated by a second voice application executing thereon.

In step 403, bandwidth reservation tables within the compliant IP network devices along the communications path are updated in accordance with the reservation message. As described above, the reservation table is typically a filter specification table, FILTER_SPEC, in accordance with the RSVP (Resource Reservation Protocol) specification. The reservation message can be a filter specification object, FILTER_SPEC object, compatible with the RSVP specification. Additionally, the reservation message includes a source address, an initial source port, and a source port range specifying the range of voice streams for transmission (e.g., SrcAddress, InitSrcPort, SrcPortRng).

Subsequently, in step 404, bandwidth for transmission of the range of voice streams is reserved using the reservation table, and in step 405, the bandwidth reservation for the range of voice streams is implemented in accordance with the reservation message. This bandwidth reservation is used to implement the multiple voice streams between the VoIP peers.

Thus, by specifying a range of voice streams with the path message and reservation message, the multiple voice stream bandwidth reservation process 400 reduces the amount of overhead traffic and resource utilization involved in implementing multiple voice streams over IP networks. This significantly reduces RSVP signaling overhead for VoIP calls between, for example, VoIP dial-peers on IP network platforms. The efficiency gains are even greater when the VoIP voice traffic traverses many IP network nodes, as in a case where long distance VoIP calls are implemented.

Computer System Environment

Figure 5:
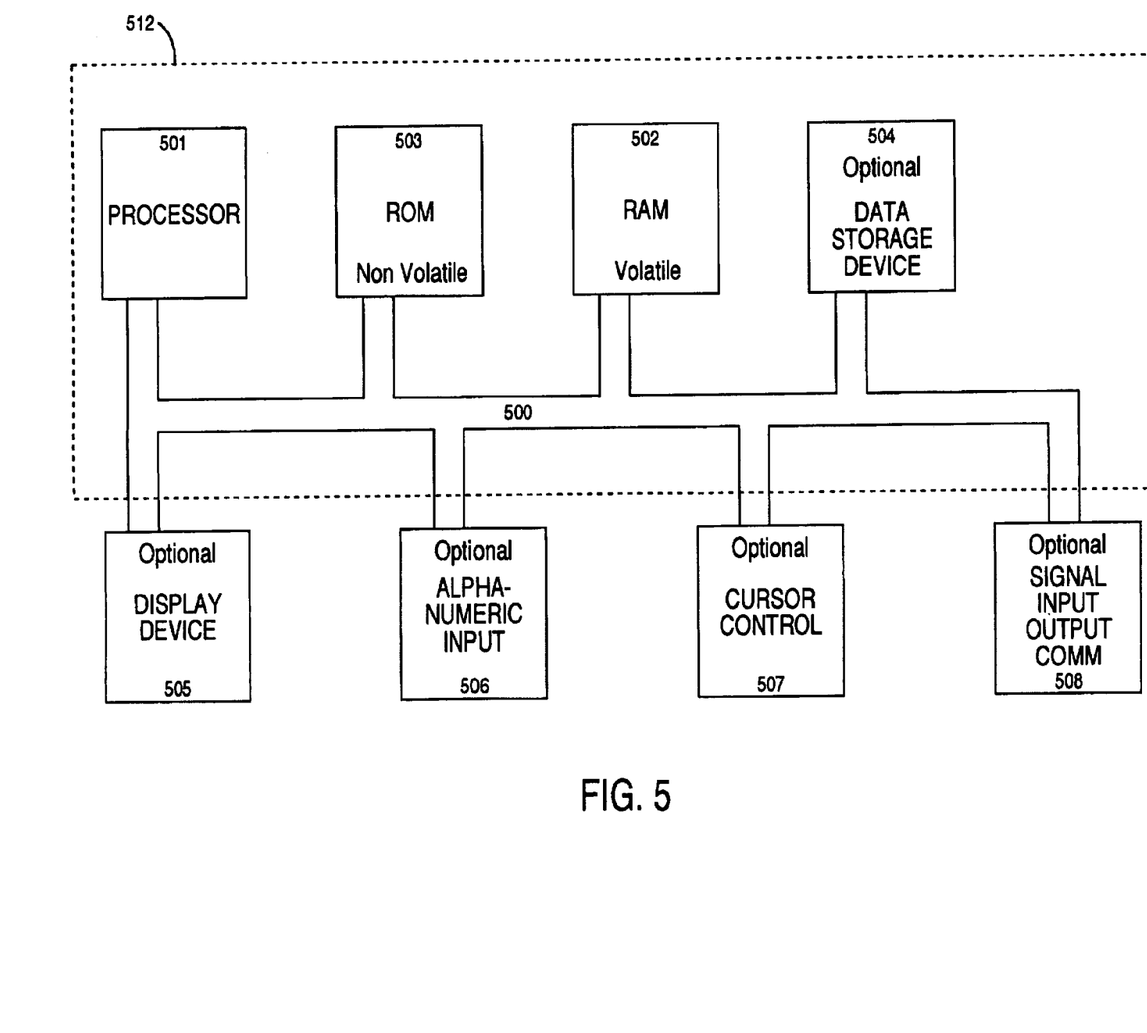
FIG. 5 shows a diagram of a computer system platform in accordance with one embodiment of the present invention.

Referring to FIG. 5, a computer system 512 is illustrated. Within the following discussions of the present invention, certain processes and steps are discussed that are realized, in one embodiment, as a series of instructions (e.g., software program) that reside within computer readable memory units of system 512 and executed by processors of system 512. When executed, the instructions cause computer system 512 to perform specific actions and exhibit specific behavior which was described in detail above.

Specific aspects of the present invention are operable within a programmed computer system which can function as IP network device, such as a VoIP gateway, a client or server machine, or implement the functionality of an IP router, load balancer, cache engine, or the like. A generalized example of such a computer system operable to implement the elements of the present invention is shown in FIG. 5. In general, the computer system of the present invention includes an address/data bus 500 for communicating information, one or more central processor(s) 501 coupled with bus 500 for processing information and instructions, a computer readable volatile memory unit 502 (e.g., random access memory, static RAM, dynamic RAM, etc.) coupled with bus 500 for storing information and instructions for the central processor(s) 501, a computer readable non-volatile memory unit 503 (e.g., read only memory, programmable ROM, flash memory, EPROM, EEPROM, etc.) coupled with bus 500 for storing static information and instructions for processor(s) 501. System 512 can optionally include a mass storage computer readable data storage device 504, such as a magnetic or optical disk and disk drive coupled with bus 500 for storing information and instructions Optionally, system 512 can also include a display device 505 coupled to bus 500 for displaying information to the computer user, an alphanumeric input device 506 including alphanumeric and function keys coupled to bus 500 for communicating information and command selections to central processor(s) 501, a cursor control device 507 coupled to bus for communicating user input information and command selections to the central processor(s) 501, and a signal input/output device 508 coupled to the bus 500 for communicating messages, command selections, data, etc., to and from processor(s) 501.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method for high quality voice communication over an IP network, the method implemented using an IP network device, comprising the steps of:
   a) transmitting a path message for a voice communication, the path message configured for establishing a communications path through an IP network;
   b) receiving a reservation message in response to the path message, the reservation message including a source port range specifying a range of voice streams for a bandwidth reservation; and
   c) implementing the bandwidth reservation for the range of voice streams in accordance with the reservation message.

2. The method of claim 1 wherein the path message is transmitted from an originating IP network device.

3. The method of claim 1 wherein the reservation message is transmitted from a terminating IP network device.

4. The method of claim 1 further including the step of generating the path message using a voice application executing on an originating IP network device.

5. The method of claim 1 further including the step of receiving the reservation massage from a terminating IP network device, the reservation message generated by the terminating IP network device.

6. The method of claim 1 further including the steps of:
   updating a bandwidth reservation table in accordance with the reservation message; and
   reserving bandwidth for transmission of the range of voice streams using the reservation table.

7. The method of claim 6 wherein the reservation table is a filter specification table in accordance with an extension of the RSVP (Resource Reservation Protocol) version 1 specification.

8. The method of claim 6 wherein the reservation message is a filter specification object in accordance with an extension of the RSVP (Resource Reservation Protocol) version 1 specification.

9. An IP network apparatus for implementing high quality voice communication over an IP network, comprising:
   a) means for transmitting a path message for a voice communication, the path message configured for establishing a communications path through an IP network;
   b) means for receiving a reservation message in response to the path message, the reservation message including a source port range specifying a range of voice streams for a bandwidth reservation; and
   c) means for implementing the bandwidth reservation for the range of voice streams in accordance with the reservation message.

10. The apparatus of claim 9 wherein the path message is transmitted from an originating IP network device.

11. The apparatus of claim 9 wherein the reservation message is transmitted from a terminating IP network device.

12. The apparatus of claim 9 further including a means for generating the path message using an application executing on an originating IP network device.

13. The apparatus of claim 9 further including a means for receiving the reservation massage from a terminating IP network device, the reservation message generated by the terminating IP network device.

14. The apparatus of claim 9 further including means for updating a bandwidth reservation table in accordance with the reservation message, and means for reserving bandwidth for transmission of the range of voice streams using the reservation table.

15. The apparatus of claim 14 wherein the reservation table is a filter specification table in accordance with an extension of the RSVP (Resource Reservation Protocol) version 1 specification.

16. The apparatus of claim 15 wherein the reservation message is a filter specification object in accordance with an extension of the RSVP (Resource Reservation Protocol) version 1 specification.

17. A computer readable medium having stored thereon computer readable instructions, which when executed by a computer system of an IP network device cause the computer system to implement a method for high quality voice communication over an IP network, the method comprising the steps of:
   a) transmitting a path message for a voice communication, the path message configured for establishing a communications path through an IP network;
   b) receiving a reservation message in response to the path message, the reservation message including a source port range specifying a range of voice streams for a bandwidth reservation; and
   c) implementing the bandwidth reservation for the range of voice streams in accordance with the reservation message.

18. The method of claim 17 wherein the path message is transmitted from an originating IP network device.

19. The method of claim 17 wherein the reservation message is transmitted from a terminating IP network device.

20. The method of claim 17 further including the step of generating the path message using a voice application executing on an originating IP network device.

21. The method of claim 17 further including the step of receiving the reservation massage from a terminating IP network device, the reservation message generated by the terminating IP network device.

22. The method of claim 17 further including the steps of:
updating a bandwidth reservation table in accordance with the reservation message; and
reserving bandwidth for transmission of the range of voice streams using the reservation table.

23. The method of claim 22 wherein the reservation table is a filter specification table in accordance with an extension of the RSVP (Resource Reservation Protocol) version 1 specification.

24. The method of claim 22 wherein the reservation message is a filter specification object in accordance with an extension of the RSVP (Resource Reservation Protocol) version 1 specification.

25. An IP network device for providing high quality voice communication over an IP network, the device including a computer system for executing computer readable instructions, which when executed by the computer system cause the IP network device to implement the steps of:
a) transmitting a path message for a voice communication, the path message configured for establishing a communications path through an IP network;
b) receiving a reservation message in response to the path message, the reservation message including a source port range specifying a range of voice streams for a bandwidth reservation; and
c) implementing the bandwidth reservation for the range of voice streams in accordance with the reservation message.

26. The IP network device of claim 25 wherein the IP network device is an originating IP network device and the path message is transmitted therefrom.

27. The IP network device of claim 25 wherein the IP network device is a terminating IP network device and is configured to transmit the reservation message in response to a received path message.

28. The IP network device of claim 25 wherein a voice application executing on the computer system generates the path message.

29. The IP network device of claim 25 wherein the reservation massage is received from a terminating IP network device, the reservation message generated by the terminating IP network device.

30. The IP network device of claim 25 wherein the bandwidth reservation table is updated in accordance with the reservation message, and wherein bandwidth for transmission of the range of voice streams is reserved using the reservation table.

31. The IP network device of claim 30 wherein the reservation table is a filter specification table in accordance with an extension of the RSVP (Resource Reservation Protocol) version 1 specification.

32. The IP network device of claim 30 wherein the reservation message is a filter specification object in accordance with an extension of the RSVP (Resource Reservation Protocol) version 1 specification.

* * * * *